United States Patent
Kang et al.

(10) Patent No.: US 11,967,995 B2
(45) Date of Patent: Apr. 23, 2024

(54) AUTOMATIC AIMING METHOD AND APPARATUS FOR UNDERWATER OPTICAL COMMUNICATION

(71) Applicant: BORsys Corp., Busan (KR)

(72) Inventors: Jin Il Kang, Busan (KR); Hyun Joong Son, Busan (KR)

(73) Assignee: BORsys Corp. (KR)

( * ) Notice: Subject to any disclaimer, the term of this patent is extended or adjusted under 35 U.S.C. 154(b) by 29 days.

(21) Appl. No.: 17/819,278

(22) Filed: Aug. 11, 2022

(65) Prior Publication Data

US 2024/0056190 A1    Feb. 15, 2024

(51) Int. Cl.
H04B 10/50    (2013.01)
H04B 11/00    (2006.01)
H04B 13/02    (2006.01)

(52) U.S. Cl.
CPC ........... *H04B 10/503* (2013.01); *H04B 11/00* (2013.01); *H04B 13/02* (2013.01)

(58) Field of Classification Search
None
See application file for complete search history.

(56) References Cited

U.S. PATENT DOCUMENTS

2014/0308042 A1 *   10/2014   Woo ................... H04B 10/2575
398/104

FOREIGN PATENT DOCUMENTS

| JP | 2009055408 A | * | 3/2009 |
| KR | 101574614 B1 | * | 12/2015 |
| KR | 20210004693 A | * | 1/2021 |

* cited by examiner

*Primary Examiner* — David W Lambert
(74) *Attorney, Agent, or Firm* — Christensen O'Connor Johnson Kindness PLLC

(57) ABSTRACT

Disclosed are an underwater optical communication aiming method and apparatus. The underwater optical communication aiming apparatus may include an optical communication module configured to transmit and receive laser beams and a plurality of acoustic modules spaced apart from one another at given intervals, disposed around the optical communication module, and configured to find a direction or relative distance of a counterpart light source under water. A direction of the optical communication module may be aimed at a counterpart light source found through the acoustic module in order to communicate with the counterpart light source by using the optical communication module.

5 Claims, 6 Drawing Sheets

AUTOMATIC AIMING METHOD AND APPARATUS FOR UNDERWATER OPTICAL COMMUNICATION

TECHNICAL FIELD

The following embodiments relate to an underwater optical communication aiming method and apparatus and, more particularly, to an underwater optical communication aiming method and apparatus for adjusting the directions of a pair of transmission and reception laser optical communication apparatuses so that the transmission and reception laser optical communication apparatuses face each other under water.

This research was a part of the project titled "Development of smart support equipment for marine police rescue crew", funded by the Korea Coast Guard (20200435).

BACKGROUND OF THE DISCLOSURE

In general, apparatuses using underwater wireless communication may include a fishfinder for checking fishes under water, a sounding machine for inspecting the shape of a seabed and reef, a submarine for the military, a sonar for detecting the sound of a screw of a vessel, and an active sonar for checking the presence of a vessel or a rock based on a reflected wave after transmitting an ultra-short wave pulse, such as an airborne ultra-short wave radar. A method for underwater wireless communication using ultrasonic waves has recently been developed.

Underwater wireless communication using a radio wave has many difficulties because the radio wave has the property that the radio wave is scattered and absorbed under water. Accordingly, in general, communication is performed by using ultrasonic waves under water.

Furthermore, the ultrasonic waves have characteristics in that they have great time delay due to a slow transfer speed and a low data transfer rate due to a narrow bandwidth.

A conventional apparatus basically includes input means, transmission means, reception means, and output means. The conventional apparatus transmits data under water by loading the data onto a light having a beam form, which is generated from a laser beam.

However, underwater laser beam wireless communication has the following problems. A visible ray under water is very easily scattered by a floating matter in the water. Accordingly, a maximum arrival distance of the visible ray is very short unlike in the art. Furthermore, the maximum arrival distance of the visible ray is severely changed depending on a state of a floating matter.

As described above, the visible ray has a very great light attenuation rate under water. In order to practically increase the range in which visible ray wireless communication is possible, lasers having very high directivity are used as light sources and made to face each other in order to increase the directivities of the lasers.

However, a laser beam having high directivity, that is, a light source, has an advantage in that it increases a maximum arrival distance of light, but has a problem in that underwater communication coverage is reduced. That is, a pair of optical communication apparatuses needs to be aligned each other under water in order to mutually perform visible ray wireless communication. However, there is a problem in that such alignment state needs to be very strictly maintained as the directivity of a light source is more improved.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Embodiments describe an underwater optical communication aiming method and apparatus and, more particularly, provide a technology for automatically adjusting the directions of a pair of transmission and reception laser optical communication apparatuses in a way that the transmission and reception laser optical communication apparatuses face each other so that the transmission and reception of data are smoothly performed when the data is transmitted and received by using a pair of transmission and reception laser beams under water.

Embodiments provide an underwater optical communication aiming method and apparatus capable of finding the direction or distance of a counterpart light source through an acoustic module and automatically aiming the direction of an ego-light source at the counterpart light source in order to communicate with the counterpart light source by using an optical communication module.

In various embodiments, an underwater optical communication aiming apparatus may include an optical communication module configured to transmit and receive laser beams and a plurality of acoustic modules spaced apart from one another at given intervals, disposed around the optical communication module, and configured to find a direction or relative distance of a counterpart light source under water. A direction of the optical communication module may be aimed at a counterpart light source found through the acoustic module in order to communicate with the counterpart light source by using the optical communication module.

The underwater optical communication aiming apparatus may further include a rotation driving unit configured to adjust the direction of the optical communication module so that the optical communication module faces the counterpart light source by incorporating the direction or relative location calculated through the acoustic module.

The underwater optical communication aiming apparatus may further include a center frame in which the optical communication module is disposed, a circular frame spaced apart from the center frame and having the plurality of acoustic modules disposed therein, and a plurality of connection frames configured to connect the center frame in which the optical communication module is disposed and the circular frame in which the plurality of acoustic modules is disposed.

The circular frame may be disposed on the side higher than the center frame. Each of the plurality of connection frames may have a given width, may reflect a laser beam transmitted by the counterpart light source, may have a given slope, and may provide the laser beam transmitted the counterpart light source with guidance to the acoustic module or the optical communication module.

The acoustic module may include three acoustic reception modules configured to detect an acoustic transmission signal from an acoustic transmission module which is the counterpart light source.

The rotation driving unit may include a biaxial rotation driving unit capable of rolling and pitching so that the direction of the optical communication module is adjusted by incorporating the direction or relative location calculated through the acoustic module.

An underwater optical communication aiming method using an underwater optical communication aiming apparatus according to another embodiment may include finding, by a plurality of acoustic modules spaced apart from one another at given intervals and disposed around an optical communication module, a direction or distance of a counterpart light source under water, aiming the direction of the optical communication module at the counterpart light source by using a rotation driving unit in order to communicate with the counterpart light source found through the acoustic module by using the optical communication module, and transmitting and receiving laser beams by using the optical communication module.

The optical communication module may be disposed in a center frame. A circular frame may be spaced apart from the center frame and the plurality of acoustic modules is disposed in the circular frame. The center frame in which the optical communication module is disposed and the circular frame in which the plurality of acoustic modules is disposed may be connected through a plurality of connection frames.

The circular frame may be disposed on the side higher than the center frame. Each of the plurality of connection frames may have a given slope, and may provide a laser beam transmitted by the counterpart light source with guidance to the acoustic module or the optical communication module.

The acoustic module may include three acoustic reception modules configured to detect an acoustic transmission signal from an acoustic transmission module, that is, the counterpart light source.

In still another embodiment, an underwater optical communication aiming method using an underwater optical communication aiming apparatus may include finding, by a first underwater optical communication aiming apparatus in which a plurality of acoustic modules is spaced apart from one another at given intervals and disposed around an optical communication module, a direction or distance of a second underwater optical communication aiming apparatus in response to an acoustic signal of the second underwater optical communication aiming apparatus under water, aiming, by the first underwater optical communication aiming apparatus, a direction of the first underwater optical communication aiming apparatus at the second underwater optical communication aiming apparatus in order to communicate with the second underwater optical communication aiming apparatus found through the acoustic module by using a rotation driving unit, finding, by the second underwater optical communication aiming apparatus, the direction of the first underwater optical communication aiming apparatus in response to an acoustic signal of the first underwater optical communication aiming apparatus so that the first underwater optical communication aiming apparatus and the second underwater optical communication aiming apparatus face each other in order to increase an optical communication reception rate, aiming, by the second underwater optical communication aiming apparatus, a light source of the second underwater optical communication aiming apparatus at the direction of the first underwater optical communication aiming apparatus in order to communicate with the first underwater optical communication aiming apparatus found through the acoustic module by using the rotation driving unit, and transmitting or receiving, by the first underwater optical communication aiming apparatus or the second underwater optical communication aiming apparatus, a laser beam by using the optical communication module.

According to embodiments, there can be provided the underwater optical communication aiming method and apparatus capable of finding the direction or distance of a counterpart light source through the acoustic module and automatically aiming the direction of an ego-light source at the counterpart light source in order to communicate with the counterpart light source by using the optical communication module.

According to embodiments, the location or direction of an optical communication unit for mutual communication under water can be easily found by using acoustic communication having a wide communication area, and the directions of optical communication units are made to face each other so that the light sources of the optical communication units are automatically subjected to be aimed at the receivers of the optical communication units point by point. Accordingly, the automatic aiming method and apparatus for underwater optical communication capable of improving efficiency of visible ray wireless communication and increasing a maximum communicatable distance under water can be provided.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

Figure 1:
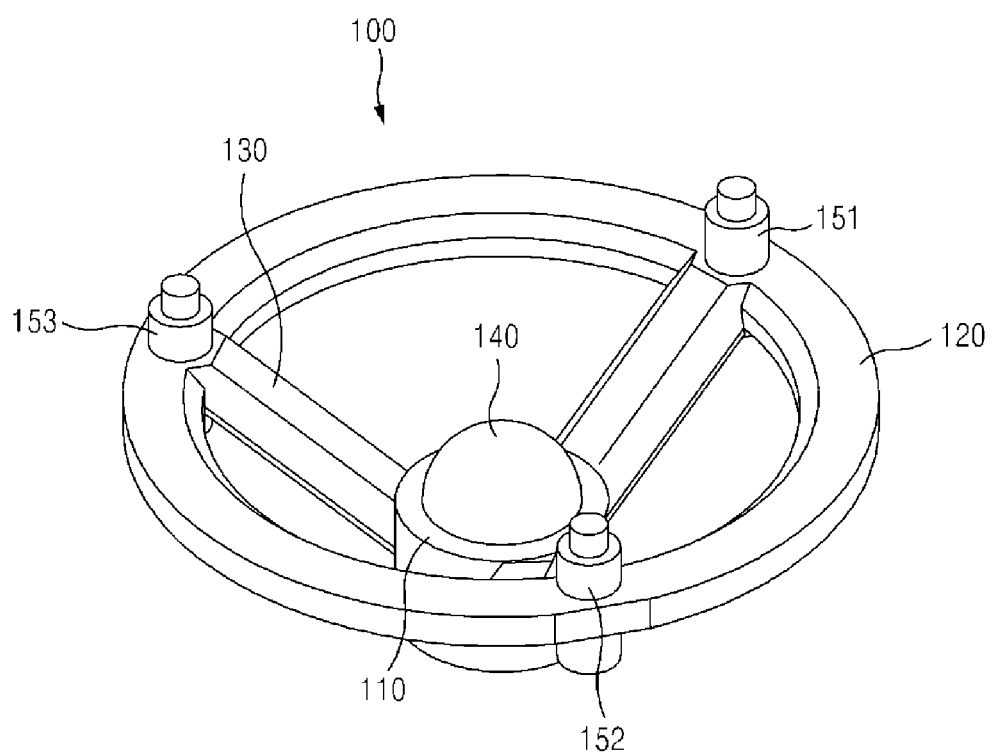
FIG. 1 is a perspective view illustrating an underwater optical communication aiming apparatus according to an embodiment.

While illustrative embodiments have been illustrated and described, it will be appreciated that various changes can be made therein without departing from the spirit and scope of the disclosure.

Hereinafter, embodiments are described with reference to the accompanying drawings. However, the described embodiments may be modified in various other forms, and the scope of the present disclosure is not restricted by the following embodiments. Furthermore, various embodiments are provided to more fully describe the present disclosure to a person having average knowledge in the art. The shapes, sizes, etc. of elements in the drawings may be exaggerated for a clear description.

The following embodiments relate to an underwater optical communication aiming method and apparatus, and provide a method of adjusting the directions of a pair of transmission and reception laser optical communication apparatuses in a way that the transmission and reception laser optical communication apparatuses face each other so that the transmission and reception of data are smoothly performed when the data is transmitted and received by using a pair of transmission and reception laser beams under water.

A laser beam capable of transmitting light farthest under water concentrates and transmits the light. Accordingly, the laser beam has a relatively longer communication distance than another light source, but has a difficulty in a communication method using the laser beam because light energy of the laser beam is concentrated without being spread. That is, a pair of optical transmission and reception apparatuses needs to face each other for communication.

In the present embodiment, as a method for solving such a problem, the location or direction of a sound can be found by using a sound having a wide transmission and reception region, and face-to-face type laser optical communication can be smoothly performed by using such a method.

Figure 2:
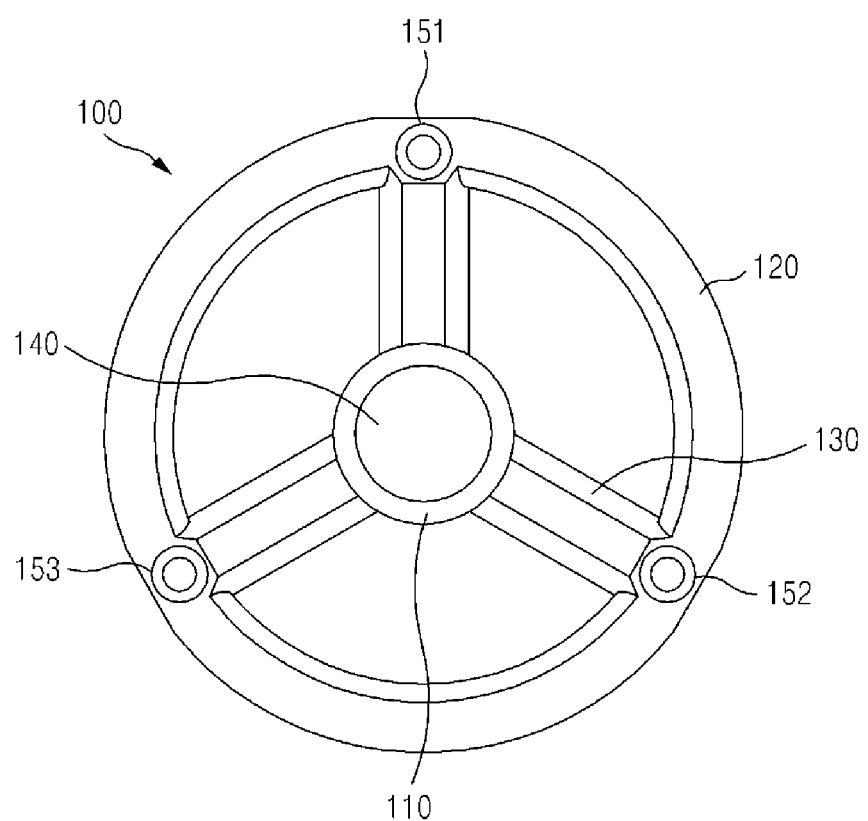
FIG. 2 is a plan view illustrating the underwater optical communication aiming apparatus according to an embodiment.

FIG. 1 is a perspective view illustrating an underwater optical communication aiming apparatus according to an embodiment. FIG. 2 is a plan view illustrating the underwater optical communication aiming apparatus according to an embodiment.

Referring to FIGS. 1 and 2, an underwater optical communication aiming apparatus 100 according to an embodiment may include an optical communication module 140 and acoustic modules 151, 152, and 153, and may further include a rotation driving unit. Furthermore, the underwater optical communication aiming apparatus 100 may further include a center frame 110, a circular frame 120, and a connection frame 130.

The optical communication module 140 is an optical communication unit, and may transmit and receive laser beams.

The acoustic modules 151, 152, and 153 are acoustic communication units, and they may be disposed around the optical communication module 140 by being spaced apart from one another at given intervals, and may find the direction or distance of a counterpart light source under water.

For example, the acoustic modules 151, 152, and 153 may include three acoustic reception modules for detecting an acoustic transmission signal from an acoustic transmission module, that is, a counterpart light source, respectively. In this case, the three acoustic reception modules may be disposed in a way to be spaced apart from one another at given intervals. Three or more acoustic reception modules may be constructed.

The optical communication module 140 may aim a direction thereof at a counterpart light source that has been found through the acoustic modules 151, 152, and 153 in order to communicate with the counterpart light source. That is, the rotation driving unit may adjust the direction of the optical communication module 140 so that the optical communication module 140 faces the counterpart light source, by incorporating a direction or relative location of the counterpart light source that has been calculated through an acoustic model.

For example, the rotation driving unit may include a biaxial rotation driving unit capable of rolling and pitching so that the direction of the optical communication module 140 is adjusted by incorporating a direction or relative location of the counterpart light source that has been calculated through the acoustic model.

The underwater optical communication aiming apparatus 100 may further include frames in which the optical communication module 140 and the acoustic modules 151, 152, and 153 are disposed, and may further include the center frame 110, the circular frame 120, and the connection frame 130, for example.

The optical communication module 140 may be disposed in the center frame 110. The circular frame 120 may be spaced apart from the center frame 110, and may have the plurality of acoustic modules 151, 152, and 153 disposed therein. Furthermore, the plurality of connection frames 130 may connect the center frame 110 in which the optical communication module 140 is disposed and the circular frame 120 in which the plurality of acoustic modules 151, 152, and 153 is disposed.

In particular, the circular frame 120 may be disposed on the side higher than the center frame 110. The plurality of connection frames 130 may have given slopes, respectively, and may provide a laser beam that is transmitted by a counterpart light source with guidance to the acoustic modules 151, 152, and 153 or the optical communication module 140 by reflecting the laser beam. For example, the plurality of connection frames 130 that connect the center frame 110 and the circular frame 120 may have a slope of about 45 degrees due to a difference between the heights of the center frame 110 and the circular frame 120. Furthermore, each of the plurality of connection frames 130 may have a given width, and may reflect a laser beam transmitted by a counterpart light source. Each of the plurality of connection frames 130 may also be formed to have a given slope on the side thereof (e.g., a slope of about 45 degrees), and may provide the laser beam with guidance to the acoustic modules 151, 152, and 153 or the optical communication module 140 by reflecting the laser beam.

As described above, for smooth wireless communication of a visible ray, such as a laser having a short communication distance and a narrow communication area under water, a transmitter and a receiver for visible ray optical communication need to face each other. Embodiments construct an acoustic communication method capable of finding the direction of an acoustic transmitter based on a shorter transmission and reception distance than that of a visible ray under water so that the transmission and receivers of a visible ray wireless communication apparatus face each other, and provide transmission and receivers for underwater visible ray wireless communication, which are constructed to face each other by combining the transmission and receivers with a visible ray wireless communication apparatus including a biaxial direction driving apparatus for making face each other the transmission and receivers of the visible ray wireless communication apparatus.

Figure 3:
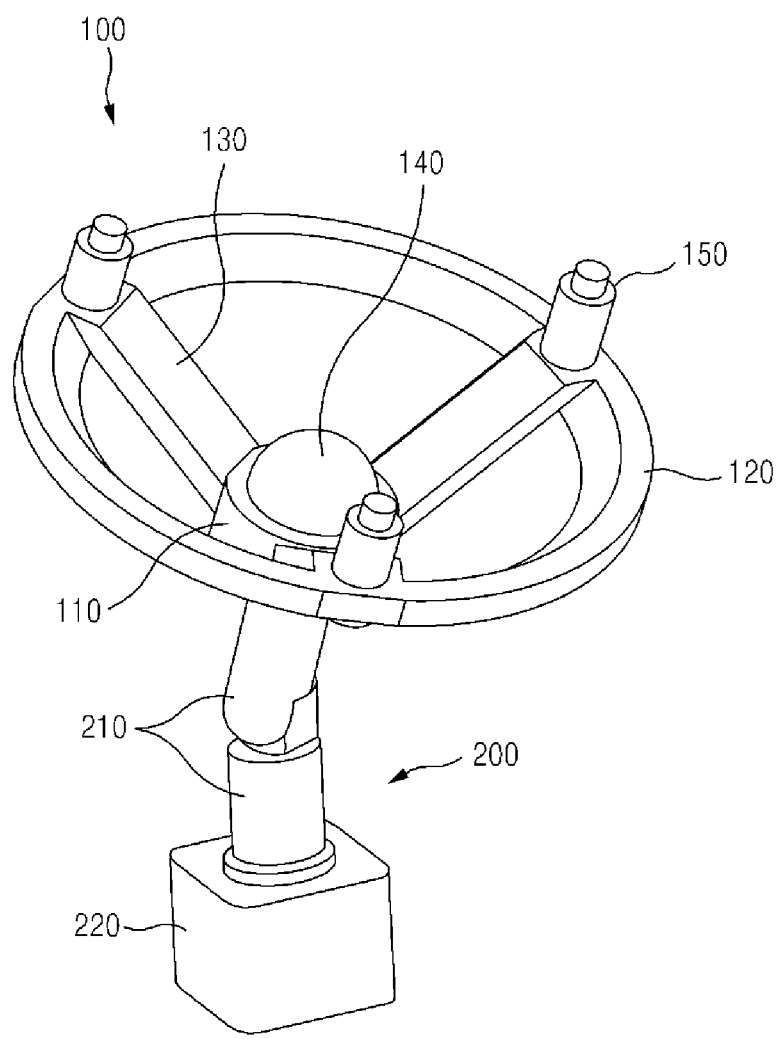
FIG. 3 is a diagram illustrating an underwater optical communication aiming apparatus including a rotation driving unit according to an embodiment.

FIG. 3 is a diagram illustrating an underwater optical communication aiming apparatus including a rotation driving unit according to an embodiment.

Referring to FIG. 3, it is very difficult to find a counterpart optical communication unit under water. Accordingly, in order to easily find the counterpart optical communication unit despite a relative current, the acoustic modules 151, 152, and 153 may be constructed around an optical communication unit in a polygon form. In this case, the optical communication unit may include the optical communication module 140, and may further include the acoustic modules 151, 152, and 153. For example, if three acoustic modules 151, 152, and 153 are disposed, the three acoustic modules 151, 152, and 153 disposed in a triangle form may find the counterpart optical communication unit or counterpart acoustic units.

After the direction of the counterpart optical communication unit is found, a rotation driving unit 200 capable of rotating the posture of a receiver may be constructed to face the counterpart optical communication unit. In this case, the rotation driving unit 200 may include a biaxial rotation driving unit 210 capable of rolling and pitching so that the direction of the biaxial rotation driving unit 210 is adjusted by incorporating a direction or relative location of the counterpart optical communication unit which is calculated through the acoustic model. The rotation driving unit 200 may further include a support unit 220 for standing erect from the ground or supporting the biaxial rotation driving unit 210 under the biaxial rotation driving unit 210.

The rotation driving unit 200 may control the biaxial rotation driving unit 210 through a control system for controlling the direction of the biaxial rotation driving unit 210 so that the direction is automatically adjusted by incorporating the direction or relative location of the counterpart optical communication unit which is calculated through the acoustic model. In this case, the control system may be separately constructed within or under the support unit 220.

More particularly, when an acoustic signal of an acoustic transmission module or an optical communication transmitter is received by an acoustic receiver including the three or more acoustic modules 151, 152, and 153, the rotation driving unit 200 may find a relative location or direction of the acoustic transmission module or optical communication transmitter, and may control the biaxial rotation driving unit 210 of an optical communication receiver to face the optical communication transmitter and an optical communication receiver by automatically rotating the biaxial rotation driving unit 210 through the control system. After controlling the biaxial rotation driving unit 210, the rotation driving unit 200 may transmit an acoustic signal so that the direction of the optical communication transmitter faces the optical communication receiver, and may control the biaxial rotation unit 210 that has received the acoustic signal to face the optical communication transmitter and the optical communication receiver by automatically rotating the biaxial rotation unit 210 through the control system including the biaxial rotation unit. Accordingly, communication efficiency of the optical communication unit can be improved because the optical communication transmitters and the optical communication receivers are made to face each other through a series of automatic control processors by using the control system. In this case, the optical communication transmitter and the optical communication receiver may be included in the optical communication unit. The optical communication unit may be divided into the optical communication transmitter and the optical communication receiver depending on its role.

An acoustic transmitter may be constructed along with another pair so that a pair of optical communication receivers on the opposite side faces each other. After the pair of optical communication receivers on the opposite side are made to face each other by biaxially rotating the biaxial rotation unit 210, optical communication may be performed, thereby improving communication performance and communication distance.

In this case, the underwater optical communication aiming apparatus 100 may transmit or receive a laser beam. That is, the underwater optical communication aiming apparatus 100 may be used as an optical transmission module or an optical reception module.

Figure 4:
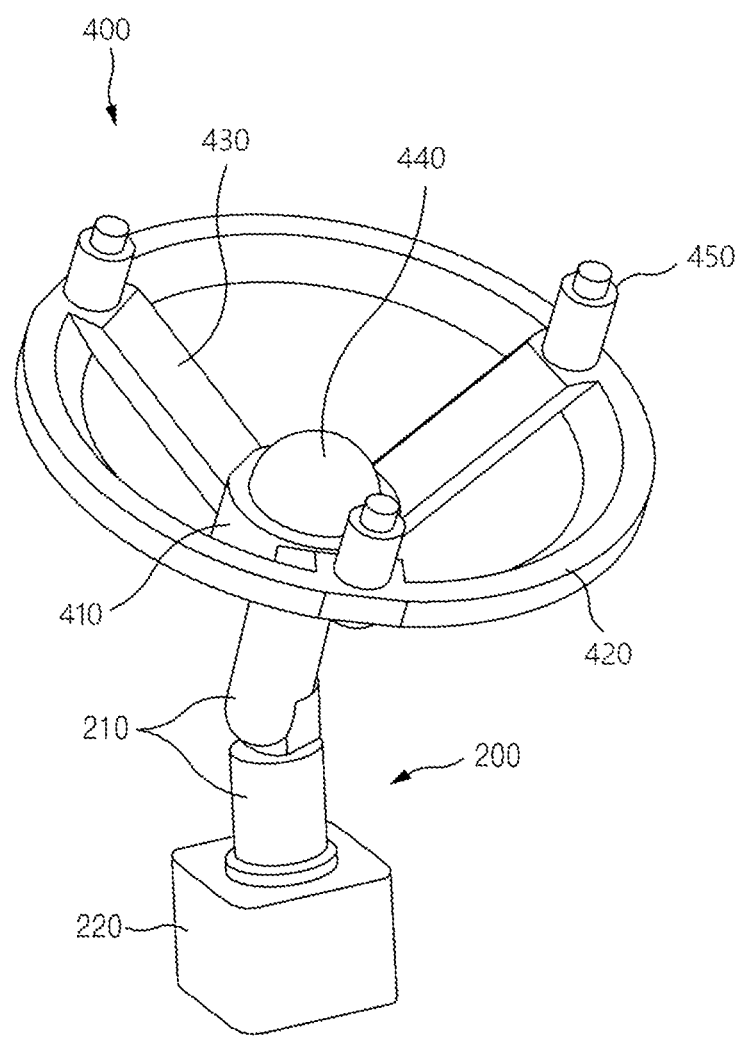
FIG. 4 is a diagram illustrating the underwater optical communication aiming apparatus including the rotation driving unit in which one acoustic transmission module is constructed according to an embodiment.

FIG. 4 is a diagram illustrating the underwater optical communication aiming apparatus including the rotation driving unit in which one acoustic transmission module is constructed according to an embodiment.

One optical transmission and reception module and another optical transmission and reception module may constitute a face-to-face type underwater laser optical communication apparatus. In this case, the optical transmission and reception module may be constructed as the underwater optical communication aiming apparatus that has been described above. That is, a pair of laser beam transmission and reception modules including one laser beam transmission and reception module (or optical communication module) disposed at the center of at least three acoustic reception sensor modules (or acoustic modules), and another pair of laser beam transmission and reception modules may provide a face-to-face type underwater laser optical communication apparatus including a laser beam transmission and reception module close to one acoustic transmission sensor module.

Referring to FIGS. 3 and 4, for example, the first underwater optical communication aiming apparatus 100 and a second underwater optical communication aiming apparatus 400 may constitute one face-to-face type underwater laser optical communication apparatus. In this case, the first underwater optical communication aiming apparatus 100 may include the plurality of acoustic reception sensor modules 151, 152, and 153, and the second underwater optical communication aiming apparatus 400 may include one acoustic transmission sensor module 450.

More particularly, as illustrated in FIG. 3, the first underwater optical communication aiming apparatus 100 may include one laser beam transmission and reception module 140 disposed at the center thereof and the at least three acoustic reception sensor modules 151, 152, and 153 disposed in the periphery thereof. Furthermore, as illustrated in FIG. 4, the second underwater optical communication aiming apparatus 400 may include one laser beam transmission and reception module 440 disposed at the center thereof and the one acoustic transmission sensor module 450 disposed in the periphery thereof.

In constructing the pair of laser beam transmission and reception modules, in order to find a direction or relative location of a counterpart light source, the three acoustic reception sensor modules 151, 152, and 153 may be constructed on the basis of the one laser beam transmission and reception module 140. The one acoustic transmission sensor module 450 capable of providing notification of the direction or distance of the counterpart light source is provided aside another laser beam transmission and reception module 440. After a relative location and direction of the acoustic transmission module 450 are calculated by the three acoustic reception sensor modules 151, 152, and 153 that has detected an acoustic transmission signal from the acoustic transmission sensor module 450, the directions of the pair of laser beam transmission and reception modules 140 and 440 may be moved so that the pair of laser beam transmission and reception modules 140 and 440 face each other.

In this case, the biaxial rotation driving unit 210 capable of rolling and pitching, which can be rotated so that the directions of the pair of laser beam transmission and reception modules 140 and 440 are adjusted, may be constructed in each of the laser beam transmission and reception module 140 and 440 so that the pair of laser beam transmission and reception modules 140 and 440 face each other.

Figure 5:
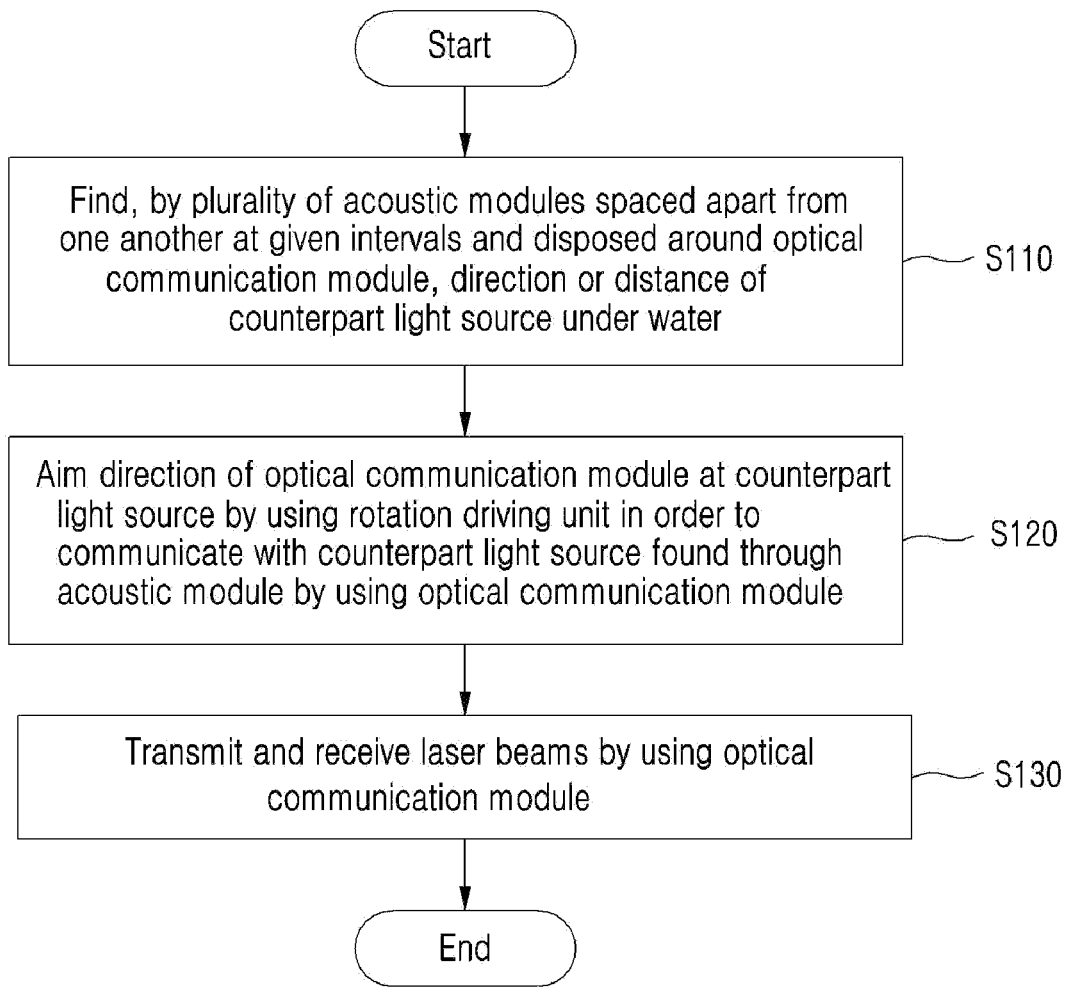
FIG. 5 is a flowchart illustrating an underwater optical communication aiming method according to an embodiment.

FIG. 5 is a flowchart illustrating an underwater optical communication aiming method according to an embodiment.

Referring to FIG. 5, the underwater optical communication aiming method using the underwater optical communication aiming apparatus according to an embodiment may include step S110 of finding, by a plurality of acoustic modules spaced apart from one another at given intervals and disposed around an optical communication module, a direction or distance of a counterpart light source under water, step S120 of aiming the direction of the optical communication module at the counterpart light source by using the rotation driving unit in order to communicate with the counterpart light source found through the acoustic module by using the optical communication module, and step S130 of transmitting and receiving laser beams by using the optical communication module.

The underwater optical communication aiming method according to an embodiment may be described by taking, as an example, the underwater optical communication aiming apparatus according to an embodiment, which has been described with reference to FIGS. 1 to 4.

In step S110, a plurality of acoustic modules may be spaced apart from one another at given intervals and disposed around an optical communication module, and may find a direction or distance of a counterpart light source under water. For example, the acoustic module may include three acoustic reception modules for detecting an acoustic transmission signal from an acoustic transmission module, that is, the counterpart light source.

In step S120, in order to communicate with the counterpart light source found through the acoustic module by using the optical communication module, the direction of the optical communication module may be aimed at the counterpart light source by using the rotation driving unit. That is, the rotation driving unit may adjust the direction of the optical communication module so that the optical communication module faces the counterpart light source by incorporating a direction or relative location of the counterpart light source, which is calculated through the acoustic model.

For example, the rotation driving unit may include the biaxial rotation driving unit capable of rolling and pitching so that the direction of the optical communication module is adjusted by incorporating the direction or relative location calculated through the acoustic model.

In step S130, laser beams may be transmitted and received by using the optical communication module.

In this case, the optical communication module may be disposed in the center frame. The circular frame may be spaced apart from the center frame, and the plurality of acoustic modules may be disposed in the circular frame. The center frame in which the optical communication module is disposed and the circular frame in which the plurality of acoustic modules is disposed may be connected through the plurality of connection frames. In particular, the circular frame may be disposed on the side higher than the center frame. Each of the plurality of connection frames may have a given slope, and may provide a laser beam transmitted by the counterpart light source with guidance to the acoustic module or the optical communication module.

First, the acoustic module can perform communication from the time when the direction of the optical communication module starts to be aimed. Accordingly, a direction or relative location of a counterpart light source can be checked by using the acoustic module, and the direction of the optical communication module can be aimed while the optical communication module radiates light.

Figure 6:
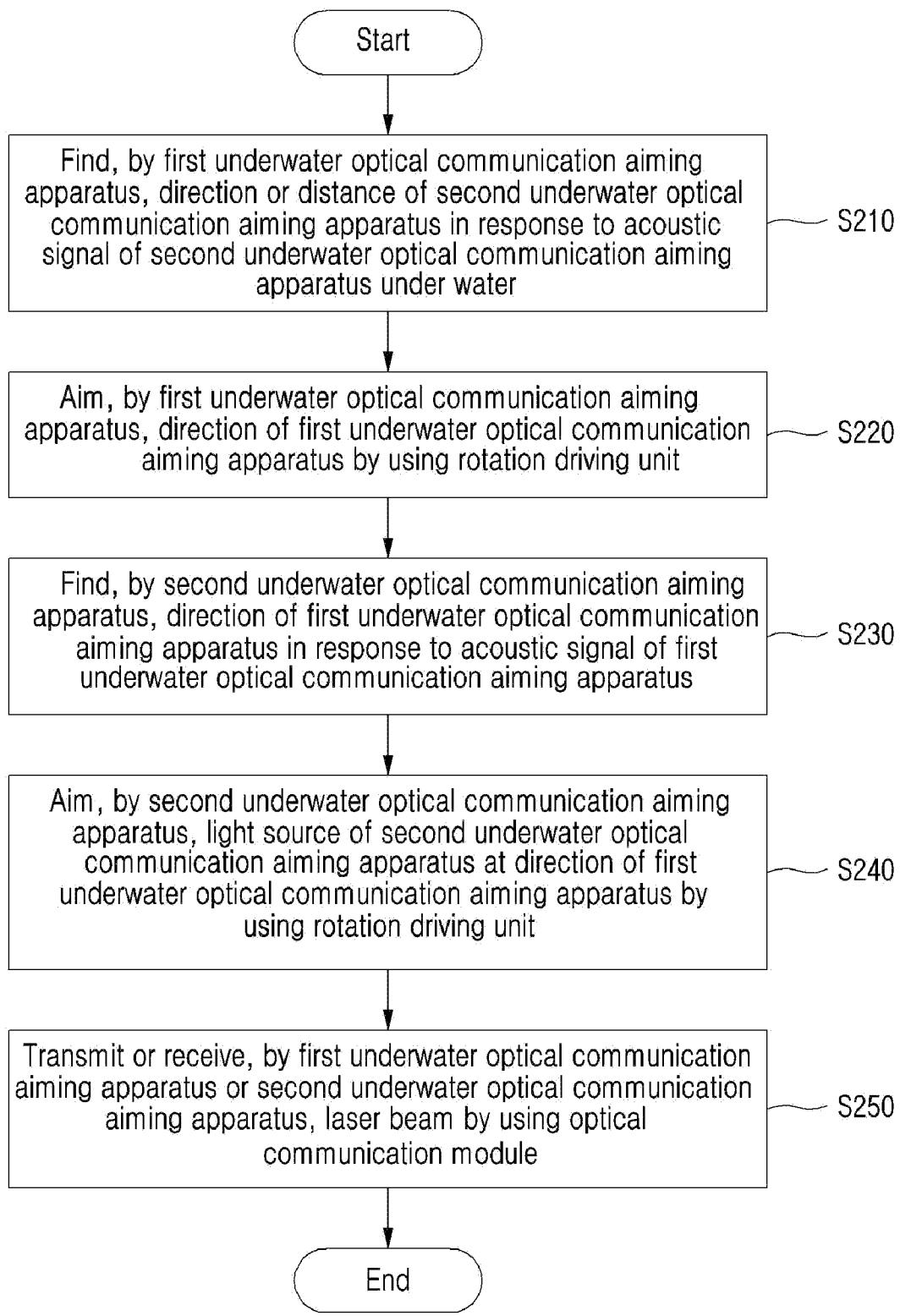
FIG. 6 is a flowchart illustrating an underwater optical communication aiming method according to another embodiment.

FIG. 6 is a flowchart illustrating an underwater optical communication aiming method according to another embodiment.

Referring to FIG. 6, the underwater optical communication aiming method using the underwater optical communication aiming apparatus according to another embodiment may include step S210 of finding, by a first underwater optical communication aiming apparatus in which a plurality of acoustic modules is spaced apart from one another at given intervals and disposed around an optical communication module, a direction or distance of a second underwater optical communication aiming apparatus in response to an acoustic signal of the second underwater optical communication aiming apparatus under water, step S220 of aiming, by the first underwater optical communication aiming apparatus, the direction of the first underwater optical communication aiming apparatus at the second underwater optical communication aiming apparatus in order to communicate with the second underwater optical communication aiming apparatus found through the acoustic module by using the rotation driving unit, step S230 of finding, by the second underwater optical communication aiming apparatus, a direction of the first underwater optical communication aiming apparatus in response to an acoustic signal of the first underwater optical communication aiming apparatus so that the first underwater optical communication aiming apparatus and the second underwater optical communication aiming apparatus face each other in order to increase an optical communication reception rate, step S240 of aiming, by the second underwater optical communication aiming apparatus, a light source of the second underwater optical communication aiming apparatus at the direction of the first underwater optical communication aiming apparatus in order to communicate with the first underwater optical communication aiming apparatus found through the acoustic module by using the rotation driving unit, and step S250 of transmitting or receiving, by the first underwater optical communication aiming apparatus or the second underwater optical communication aiming apparatus, a laser beam by using the optical communication module.

A description of the underwater optical communication aiming method using the underwater optical communication aiming apparatus according to another embodiment is redundant with that of the underwater optical communication aiming apparatus and/or the underwater optical communication aiming method described with reference to FIGS. 1 to 5, and thus a detailed description of the underwater optical communication aiming method is omitted. For example, the underwater optical communication aiming method using the underwater optical communication aiming apparatus according to another embodiment may be operated by the underwater optical communication aiming apparatus described with reference to FIG. 4.

As described above, according to embodiments, the location or direction of an optical communication unit for mutual communication under water can be easily found by using acoustic communication having a wide communication area, and the directions of optical communication units are made to face each other so that the light sources of the optical communication units are automatically subjected to be aimed at the receivers of the optical communication units point by point. Accordingly, efficiency of visible ray wireless communication can be improved, and a maximum communicatable distance under water can be increased.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned elements, such as the system, configuration, device, and circuit, are coupled or combined in a form different from that of the described method or replaced or substituted with other elements or equivalents.

Accordingly, other implementations, other embodiments, and the equivalents of the claims fall within the scope of the claims.

The embodiments of the disclosure in which an exclusive property or privilege is claimed are defined as follows:

1. An underwater optical communication aiming apparatus comprising:
an optical communication module configured to transmit and receive laser beams; and
a plurality of acoustic modules spaced apart from one another at given intervals, disposed around the optical communication module, and configured to find a direction or relative distance of a counterpart light source under water,
wherein a direction of the optical communication module is aimed at the counterpart light source found through the plurality of acoustic modules in order to communicate with the counterpart light source by using the optical communication module,
the underwater optical communication aiming apparatus further comprises:
a center frame in which the optical communication module is disposed;
a circular frame spaced apart from the center frame and having the plurality of acoustic modules disposed therein; and
a plurality of connection frames configured to connect the center frame in which the optical communication module is disposed and the circular frame in which the plurality of acoustic modules is disposed,
wherein the circular frame is disposed on a side higher than the center frame, and
each of the plurality of connection frames has a given width, reflects a laser beam transmitted by the counterpart light source, has a given slope, and provides the laser beam transmitted the counterpart light source with guidance to the plurality of acoustic modules or the optical communication module.

2. The underwater optical communication aiming apparatus of claim 1, further comprising a rotation driving unit configured to adjust the direction of the optical communication module so that the optical communication module faces the counterpart light source by incorporating the direction or relative location calculated through the plurality of acoustic modules.

3. The underwater optical communication aiming apparatus of claim 1, wherein each of the plurality of acoustic modules comprises three acoustic reception modules configured to detect an acoustic transmission signal from an acoustic transmission module which is the counterpart light source.

4. The underwater optical communication aiming apparatus of claim 2, wherein the rotation driving unit comprises a biaxial rotation driving unit capable of rolling and pitching so that the direction of the optical communication module is adjusted by incorporating the direction or relative location calculated through the plurality of acoustic modules.

5. An underwater optical communication aiming method using an underwater optical communication aiming apparatus, the method comprising:
finding, by a first underwater optical communication aiming apparatus in which a plurality of acoustic modules is spaced apart from one another at given intervals and disposed around an optical communication module, a direction or distance of a second underwater optical communication aiming apparatus in response to an acoustic signal of the second underwater optical communication aiming apparatus under water;
aiming, by the first underwater optical communication aiming apparatus, a direction of the first underwater optical communication aiming apparatus at the second underwater optical communication aiming apparatus in order to communicate with the second underwater optical communication aiming apparatus found through the plurality of acoustic modules by using a rotation driving unit;
finding, by the second underwater optical communication aiming apparatus, the direction of the first underwater optical communication aiming apparatus in response to an acoustic signal of the first underwater optical communication aiming apparatus so that the first underwater optical communication aiming apparatus and the second underwater optical communication aiming apparatus face each other in order to increase an optical communication reception rate;
aiming, by the second underwater optical communication aiming apparatus, a light source of the second underwater optical communication aiming apparatus at the direction of the first underwater optical communication aiming apparatus in order to communicate with the first underwater optical communication aiming apparatus found through the plurality of acoustic modules by using the rotation driving unit; and
transmitting or receiving, by the first underwater optical communication aiming apparatus, a laser beam by using the optical communication module,
wherein the optical communication module is disposed in a center frame,
a circular frame is spaced apart from the center frame and the plurality of acoustic modules is disposed in the circular frame,
the center frame in which the optical communication module is disposed and the circular frame in which the plurality of acoustic modules is disposed are connected through a plurality of connection frames,
the circular frame is disposed on a side higher than the center frame, and
each of the plurality of connection frames has a given width, reflects a laser beam transmitted by the light source of the second underwater optical communication aiming apparatus, has a given slope, and provides the laser beam transmitted by the light source of the second underwater optical communication aiming apparatus with guidance to the plurality of acoustic modules or the optical communication module.

* * * * *